# (12) United States Patent
Iwai et al.

(10) Patent No.: US 9,470,284 B2
(45) Date of Patent: Oct. 18, 2016

(54) FRICTION MEMBER FOR BICYCLE BRAKE

(71) Applicant: Shimano Inc., Sakai, Osaka (JP)

(72) Inventors: Tooru Iwai, Sakai (JP); Makoto Souwa, Sakai (JP)

(73) Assignee: SHIMANO INC., Osaka (JP)

( * ) Notice: Subject to any disclaimer, the term of this patent is extended or adjusted under 35 U.S.C. 154(b) by 5 days.

(21) Appl. No.: 14/583,193

(22) Filed: Dec. 26, 2014

(65) Prior Publication Data

US 2016/0116012 A1   Apr. 28, 2016

Related U.S. Application Data

(63) Continuation-in-part of application No. 14/521,472, filed on Oct. 23, 2014, now abandoned.

(51) Int. Cl.
| F16D 69/02 | (2006.01) |
| C22C 1/04 | (2006.01) |
| C22C 32/00 | (2006.01) |

(52) U.S. Cl.
CPC ........... F16D 69/027 (2013.01); C22C 1/0491 (2013.01); C22C 32/0052 (2013.01); B22F 2998/10 (2013.01); C22C 32/0021 (2013.01)

(58) Field of Classification Search
CPC .... F16D 69/02; F16D 69/023; F16D 69/027; C22C 32/0021; C22C 32/0052; C22C 1/0491; C22C 1/05; B22F 2998/10
See application file for complete search history.

(56) References Cited

U.S. PATENT DOCUMENTS

| 5,145,619 A * | 9/1992 | Abramovici | C04B 35/651 264/649 |
| 5,526,914 A * | 6/1996 | Dwivedi | C23C 30/00 188/218 XL |
| 5,620,791 A * | 4/1997 | Dwivedi | C22C 1/1015 188/218 XL |
| 7,682,704 B2 * | 3/2010 | Dwivedi | B22F 1/0059 428/547 |
| 7,749,597 B2 * | 7/2010 | Tsushima | B22D 19/00 164/97 |
| 8,012,574 B2 * | 9/2011 | Tsushima | B22D 19/14 164/97 |
| 2016/0223042 A1 * | 8/2016 | Iwai | F16D 69/027 |

FOREIGN PATENT DOCUMENTS

JP    2010-001985 A    1/2010

OTHER PUBLICATIONS

Yong-Jai Kwon, Makoto Kobashi, Takao Choh, and Naoyuki Kanetake, "Fabrication of TiC/Cu Composites by Combustion Synthesis in Cu—Ti—C System", J. Japan Inst. Metals, vol. 65, No. 4 (2001), pp. 273-278.

* cited by examiner

*Primary Examiner* — Thomas J Williams

(57) ABSTRACT

A friction member for a bicycle brake that is obtained through combustion synthesis is disclosed. One example of the bicycle brake friction member includes an intermetallic compound, which is obtained from a first metal and a second metal, and a metal phase, which is obtained from the first metal.

24 Claims, 4 Drawing Sheets

FRICTION MEMBER FOR BICYCLE BRAKE

CROSS-REFERENCE TO RELATED APPLICATIONS

This application is based upon and claims the benefit of priority from prior U.S. patent application Ser. No. 14/521,472, filed on Oct. 23, 2014, the entire contents of which are incorporated herein by reference.

FIELD

The present invention relates to a bicycle component, particularly, to a friction member for a bicycle brake.

BACKGROUND

Physical properties needed for a bicycle component differ depending on the type of the bicycle component. Some bicycle components need satisfactory tensile strength. Some bicycle components need satisfactory wear resistance. Other bicycle components need satisfactory tensile strength and satisfactory wear resistance.

A bicycle brake moves a friction member when a brake lever is operated and generates a braking force from the friction of the friction member with a rotor or a wheel rim. High temperature braking force (fade performance), the ratio of a wet condition braking force to a dry condition braking force (wet/dry ratio), wear resistance of the friction member, braking noise, or the like may be used to evaluate the braking performance of a bicycle brake. The friction member is a factor that affects the braking performance.

The ease for manufacturing the friction member and the yield of the friction member affect the manufacturing cost of the friction member. Friction members for bicycle brakes are mainly categorized into friction members formed from a synthetic resin (i.e., resin pad) and friction members formed from an inorganic material such as a metal composite material (i.e., metal pads). Metal pads are superior to resin pads in the high temperature braking force (fade performance). The manufacturing cost of metal pads is higher than that of resin pads mainly because of low yield of the metal pads.

SUMMARY

It is an object of the present invention to provide a bicycle component that is formed from a metal composite material. Some aspects of the present invention are directed to a friction member for a bicycle brake that is capable of improving at least one of the braking properties. Another aspect of the present invention is directed to an inexpensive method for manufacturing a friction member for a bicycle brake having an improved braking performance. Further, another aspect of the present invention is directed to a bicycle component that has satisfactory tensile strength and/or a satisfactory wear resistance.

A first aspect of the present invention provides a friction member for a bicycle brake that is obtained through combustion synthesis.

In one example, the friction member includes an intermetallic compound obtained through combustion synthesis.

In one example, the friction member further includes a metal phase.

In one example, the metal phase includes at least one of Cu, Al, Zn, and Ni.

In one example, the metal phase includes Cu, and the intermetallic compound includes at least one of TiCu, $Ti_2Cu$, $Ti_3Cu_4$, $Ti_2Cu_3$, and $TiCu_4$.

In one example, the friction member further includes at least one of TiC and $Cu_3Ti_3O$.

In one example, the friction member is obtained by subjecting a powder compacted body, which includes at least three types of powder, to combustion synthesis.

In one example, the at least three types of powder are copper powder, titanium powder, and carbon powder.

In one example, the powder compacted body contains 10 to 30 wt % of the carbon powder relative to the total weight of the copper powder.

In one example, the powder compacted body contains 0.1 to 50 wt % of the titanium powder relative to the total weight of the copper powder.

In one example, the powder compacted body contains 5 to 15 wt % of the titanium powder relative to the total weight of the copper powder.

A second aspect of the present invention provides a friction member for a bicycle brake. The friction member includes an intermetallic compound obtained from a first metal and a second metal, and a metal phase formed from the first metal.

In one example, the first metal is either one of Cu, Al, Zn, and Ni. Further, the second metal is Ti.

In one example, the first metal is Cu, and the intermetallic compound is at least one of TiCu, $Ti_2Cu$, $Ti_3Cu_4$, $Ti_2Cu_3$, and $TiCu_4$.

In one example, the friction member further includes at least one of TiC and $Cu_3Ti_3O$.

In one example, the friction member is obtained by subjecting a powder compacted body, which includes at least three types of powder, to combustion synthesis.

In one example, the at least three types of powder are copper powder, titanium powder, and carbon powder.

In one example, the powder compacted body contains 10 to 30 wt % of the carbon powder relative to the total weight of the copper powder.

In one example, the powder compacted body contains 0.1 to 50 wt % of the titanium powder relative to the total weight of the copper powder.

In one example, the powder compacted body contains 5 to 15 wt % of the titanium powder relative to the total weight of the copper powder.

A third aspect of the present invention provides a bicycle component including a Cu—Ti based intermetallic compound.

In one example, the bicycle component further includes a metal phase.

In one example, the metal phase includes Cu. The Cu—Ti based intermetallic compound includes at least one of TiCu, $Ti_2Cu$, $Ti_3Cu_4$, $Ti_2Cu_3$, and $TiCu_4$.

In one example, the bicycle component further includes at least one of TiC and $Cu_3Ti_3O$.

In one example, the Cu—Ti based intermetallic compound is obtained by subjecting a powder compacted body, which includes at least copper powder, titanium powder, and carbon powder, to combustion synthesis.

In one example, the powder compacted body contains 10 to 30 wt % of the carbon powder relative to the total weight of the copper powder.

In one example, the powder compacted body contains 0.1 to 50 wt % of the titanium powder relative to the total weight of the copper powder.

In one example, the powder compacted body contains 5 to 15 wt % of the titanium powder relative to the total weight of the copper powder.

In one example, the bicycle component is a friction member for a bicycle brake.

A fourth aspect of the present invention provides a method of manufacturing a friction member for a bicycle brake. The method includes molding a powder compacted body, and subjecting the powder compacted body to combustion synthesis.

In one example, the powder compacted body includes copper powder, titanium powder, and carbon powder.

In one example, the powder compacted body contains 10 to 30 wt % of the carbon powder relative to the total weight of the copper powder.

In one example, the powder compacted body contains 0.1 to 50 wt % of the titanium powder relative to the total weight of the copper powder.

In one example, the powder compacted body contains 5 to 15 wt % of the titanium powder relative to the total weight of the copper powder.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

Figure 1A:
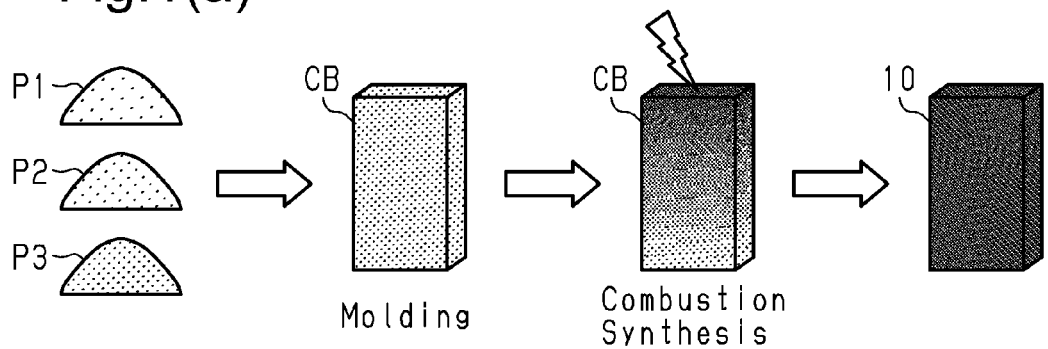
FIG. 1(a) is a schematic diagram illustrating a method for manufacturing one embodiment of a friction member.

A method of manufacturing a friction member 10 of a bicycle brake, which is one example of a bicycle component, will now be described. As shown in FIG. 1(a), the method of manufacturing the friction member 10 includes molding a powder compacted body CB that includes at least three types of powder P1, P2, and P3, and subjecting the powder compacted body CB to combustion synthesis. The combustion synthesis may be referred to as self-propagating high-temperature synthesis. The at least three types of powder P1, P2, and P3 are reactants in the combustion synthesis. The friction member 10 that includes an intermetallic compound such as a Cu—Ti based intermetallic compound is manufactured by combustion synthesis. In the present embodiment, the friction member 10 includes, as an intermetallic compound, at least one of TiCu, $Ti_2Cu$, $Ti_3Cu_4$, $Ti_2Cu_3$, and $TiCu_4$. The friction member 10 may further include at least one of TiC and $Cu_3Ti_3O$.

The friction member 10 that is manufactured through combustion synthetic has a satisfactory braking performance, such as high temperature braking force (fade performance), the ratio of a wet condition braking force to a dry condition braking force (wet/dry ratio), wear resistance, braking noise, or the like. Particularly, the friction member 10 of the present embodiment allows the wet/dry ratio to be close to one and can reduce the braking noise.

The combustion synthesis is started by subjecting the powder compacted body CB to an external thermal stimulation in order to locally induce a combustion reaction, which is an exothermic reaction, at the powder compacted body CB. More specifically, the combustion synthesis is started by locally irradiating the powder compacted body CB with a laser beam to locally heat the powder compacted body CB. For example, a portion of the powder compacted body CB is irradiated with a laser beam at an intensity of 100 to 400 W for 5 to 30 seconds. Heat is generated when a portion of the powder compacted body CB locally undergoes a combustion reaction. The heat induces a combustion reaction at an adjacent portion. For example, as shown in FIG. 1(a), an external thermal stimulation, which is applied to one end of the powder compacted body CB, induces a combustion reaction at that end. The combustion reaction successively advances in the powder compacted body CB from one end to the other end. The combustion synthesis is completed in an extremely short time without the need for continuous heating from the exterior. This results in an extremely small amount of heating energy supplied from the exterior. Thus, the combustion synthesis significantly reduces the manufacturing cost of the friction member 10 that includes an intermetallic compound and has a superior braking performance.

Figure 1B:
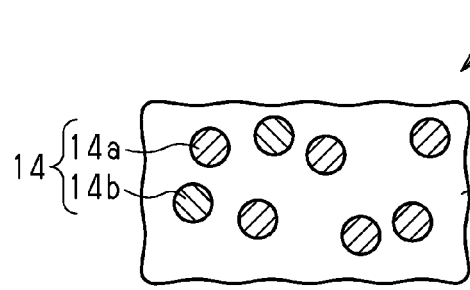
FIGS. 1(b) and 1(c) are schematic diagrams showing a microscope image of the friction member.

The microscopic structure of the friction member 10 will now be described. As shown in FIG. 1(b), the friction member 10 includes a metal phase (a metal continuous phase) 12 and an intermetallic compound 14 (here, intermetallic compound particles) having uniform or non-uniform shapes. The metal phase 12 includes a matrix phase or a first phase. The intermetallic compound 14 is usually dispersed in the metal phase to form a dispersion phase, a grain phase, or a second phase. The intermetallic compound 14 includes, for example, at least one of TiCu, $Ti_2Cu$, $Ti_3Cu_4$, $Ti_2Cu_3$, and $TiCu_4$. In the illustrated example of FIG. 1(b), the intermetallic compound 14 includes a first intermetallic compound 14a and a second intermetallic compound 14b. The first intermetallic compound 14a is, for example, $Ti_2Cu$. The second intermetallic compound 14b is, for example, $TiCu_4$. The metal phase 12 includes at least one of Cu, Al, Zn, and Ni. In the illustrated example of FIG. 1(b), the metal phase 12 is a single-metal phase such as a metal Cu phase. That is, the friction member 10 includes an intermetallic compound 14, which is obtained from a first metal (here, Cu) and a second metal (here, Ti), and a metal phase 12 of the first metal (here, Cu). In several examples, the metal phase 12 may be a metal solid solution phase such as a CuTi solid solution. Further, in several examples, the metal phase 12 may be the intermetallic compound.

Figure 1C:
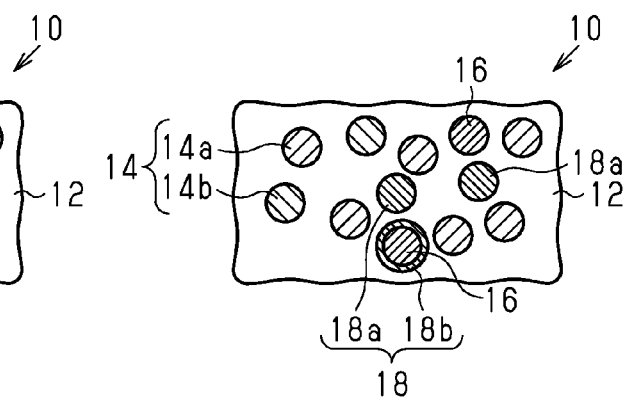

In the example of FIG. 1(c), the friction member 10 includes non-metal particles 16 and reinforced phases 18 that are dispersed in the metal phase 12. The non-metal particles 16 are, for example, carbon particles. The reinforced phases 18 are, for example, $Cu_3Ti_3O$ or TiC. The reinforced phases 18 may include particle-like reinforced phases 18a and/or film-like reinforced phases 18b. The film-like reinforced phases 18b may partially or entirely cover some of the non-metal particles 16. In several examples, the particle-like reinforced phases 18a and the film-like reinforced phases 18b form a meshed reinforced structure.

The at least three types of powder P1, P2, and P3 are selected and configured to enhance the progress of the combustion synthesis. In the present embodiment, the at least three types of powder P1, P2, and P3, that is, the reactants, include copper powder, titanium powder, and carbon powder. Further, aluminum powder, zinc powder, nickel powder, and any combination of these powders may be used in lieu of or in addition to copper powder. As illustrated in the example, the powder compacted body including copper powder, titanium powder, and carbon powder is subject to the combustion synthesis to obtain a composite material that includes an intermetallic compound, such as TiCu, $Ti_2Cu$, $Ti_3Cu_4$, and $Ti_2Cu_3$, and $TiCu_4$. Although a block formed from a typical intermetallic compound is generally brittle and cracks easily, the friction member 10 of the present embodiment, which is formed from the composite material including the intermetallic compound, resists cracking. Accordingly, the friction member 10 of the present embodiment has superior durability and superior manufacturing yield in addition to having a superior braking performance.

The particle diameters of powder P1, P2, and P3 are appropriately determined by taking into consideration the easiness for molding the powder compacted body and the enhancement of the advancement of the combustion synthesis. For example, the particle diameter may be in the range of 1 to 200 μm. When a reactant system includes copper powder, titanium powder, and carbon powder, the particle diameter of copper powder that is a main component of a metal phase may be greater than the diameter of a titanium particle and a carbon particle. In one example, the particle diameter of the copper powder is 100 to 180 μm, the particle diameter of the titanium particle is 10 to 100 μm, and the particle diameter of the carbon particle is 1 to 10 μm.

When taking into consideration enhancing the advancement of the combustion synthesis and the thermal performance of the friction member, a higher purity of copper powder is more preferable. It is particularly preferred when the purity of copper powder is 99% or higher. Pure titanium may be used as the titanium powder. However, recycled titanium powder, which can be obtained at low cost, may be used. The carbon powder is preferably graphite, which can be obtained at a low cost. Graphite decreases cracking in the composite material that includes the intermetallic compound and functions as a solid lubricant that reduces the braking noise.

Other than the at least three types of powder P1, P2, and P3, which are the reactants, the powder compacted body may further include an inorganic powder additive, such as mullite, zircon, or calcium fluoride. The inorganic powder additive functions as a filler, a solid lubricant, a friction coefficient adjusting agent, or the like.

The advantages of the reactant system including copper powder, titanium powder, and carbon powder will now be described with reference to FIGS. 2(a) and 2(b).

Figure 2A:
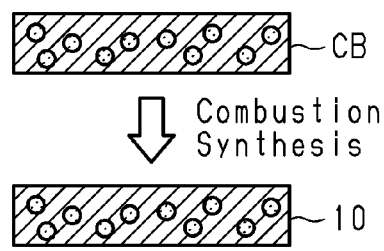
FIGS. 2(a) and 2(b) are schematic diagrams of friction members in example 1 and comparative example 1.

FIG. 2(a) shows example 1 of the powder compacted body CB molded to have a flat shape and formed from copper powder, titanium powder, and carbon powder. The powder compacted body CB of example 1 was subjected to combustion synthesis to obtain a reaction product. The reaction product was substantially identical in shape as the original flat shape. The reaction product of example 1 was usable as the friction member without undergoing any processes or by slightly undergoing profile shaping. In this manner, by subjecting the powder compacted body CB including copper powder, titanium powder, and carbon powder to combustion synthesis, the friction member 10 can be manufactured with the desired shape with a high yield.

Figure 2B:
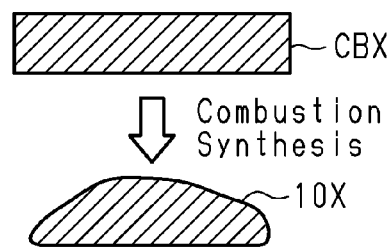

In contrast, FIG. 2(b) shows a comparative example 1 of a powder compacted body CBX molded to have a flat shape and formed from copper powder and titanium powder. The powder compacted body CBX of comparative example 1 was subjected to combustion synthesis under the same conditions as example 1 to obtain a reaction product 10X. In some cases, the reaction product 10X was deformed and differed in shape from the original flat shape. Accordingly, it was understood that the application of carbon powder stabilizes the shape of the friction member 10 and increases the yield of the friction member 10.

Although not shown in the drawings, in a comparative example 2, a powder compacted body having a flat shape was molded containing aluminum powder, titanium powder, and carbon powder. When the powder compacted body of the comparative example 2 was subjected to combustion synthesis under the same conditions as example 1, a reaction product having many cracks was obtained in some cases. Thus, it was understood that the combined use of copper powder, titanium powder, and carbon powder increased the yield of the friction member 10.

From an analysis result of the friction member 10 of example 1, it is assumed that the reaction caused by combustion synthesis advances as follows. Before combustion synthesis is started, copper powder, titanium powder, and carbon powder are mixed in the powder compacted body CB. When the combustion synthesis is started, solid diffusion first advances between copper atoms of the copper powder and titanium atoms of the titanium powder to form a copper titanium (Cu—Ti) solid solution. As the combustion synthesis advances, an intermetallic compound that includes at least one of TiCu, $Ti_2Cu$, $Ti_3Cu_4$, $Ti_2Cu_3$, and $TiCu_4$ is formed from the copper atoms and the titanium atoms of the copper titanium solid solution. After the combustion synthesis ends, the intermetallic compound disperses in the metal phase formed by the copper titanium solid solution. The carbon powder disperses in the metal phase. As the combustion synthesis advances, carbon atoms of the carbon powder react with or chemically bond to the titanium atoms of the metal phase to form a TiC reinforced phase or reinforced structure. In the same manner, as the combustion synthesis advances, oxygen atoms react with the titanium atoms and the copper atoms of the in the metal phase and form a $Cu_3Ti_3O$ reinforced phase or a reinforced structure. It is assumed that these reinforced structures significantly decreases movement of the Cu—Ti based intermetallic compound, that is, deformation of the reaction product. In accordance with the type and amount of the powder forming the powder compacted body CB, the metal phase may be formed from at least one selected from a group consisting of a metal solid solution, an intermetallic compound, pure metal, and any combination of these matters.

In the powder compacted body CB containing at least copper powder, titanium powder, and carbon powder, it is preferred that the carbon powder be 10 to 30 wt % of the total weight of the copper powder. The mixing of the carbon powder within this range reduces cracks in the friction member 10 having the desired shape, improves the yield of the friction member 10, and reduces the manufacturing cost. Preferably, the powder compacted body CB contains 0.1 to 50 wt % of the titanium powder P2 relative to the total weight of the copper powder P1. The mixing of the titanium powder within this range prevents or decreases cracking in the friction member 10 during or after the combustion synthesis. This further improves the yield when manufacturing the friction member 10 having the desired shape.

The amount of the titanium powder and the wear resistance of the friction member will now be described with reference to Table 1 and FIG. 3.

Mixtures shown in Table 1 are used to mold powder compacted bodies containing at least copper powder, titanium powder, and carbon powder. The powder compacted bodies are subjected to the combustion synthesis to manufacture friction members of examples 2 to 5. Mullite, zircon, and calcium fluoride are inorganic powder additives.

TABLE 1

| inorganic powder in powder compacted body | ex. 2 | ex. 3 | ex. 4 | ex. 5 |
|---|---|---|---|---|
| titanium (wt %) | 4 | 8 | 15 | 23 |
| copper (wt %) | 72 | 68 | 61 | 53 |
| graphite (wt %) | 10 | 10 | 10 | 10 |
| mullite (wt %) | 3 | 3 | 3 | 3 |
| zircon (wt %) | 4 | 4 | 4 | 4 |
| calcium fluoride (wt %) | 6 | 6 | 6 | 6 |
| Ti/Cu ratio (%) | 5.6 | 12 | 25 | 43 |

Figure 3:
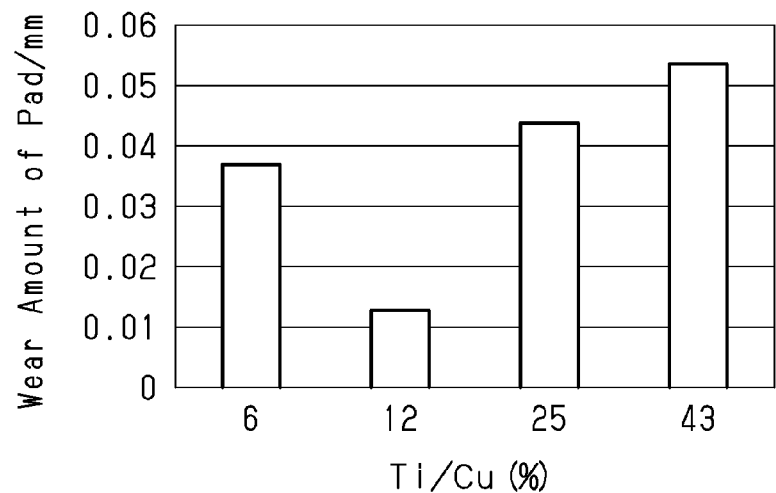
FIG. 3 is a graph showing the result of a wear resistance test performed on several examples of the friction member.

Referring to FIG. 3, the wear amount decreases as the Ti/Cu ratio increases from 0.1%, decreases most when the Ti/Cu ratio is near approximately 12%, and increases afterward. The wear resistance is greater when the amount of wear is smaller.

Test results of several examples having a Ti/Cu ratio within 0.1% to 50% show a wear resistance that is superior to a conventional metal pad. Therefore, it is preferred that the powder compacted body contains 0.1 to 50 wt % of the titanium powder relative to the total weight of the copper powder. It is further preferred that the powder compacted body contains 5 to 15 wt % of the titanium powder relative to the total weight of the copper powder. By mixing the titanium powder within this range, an inexpensive friction member is manufactured with a wear resistance that is equivalent or superior to the conventional metal pad. Particularly, it is preferred that the powder compacted body contains 10 to 15 wt % of the titanium powder relative to the copper powder. The mixing of the titanium powder within this range obtains a friction member that is superior to the conventional metal pad and has significant superiority in wear resistance.

Figure 4:
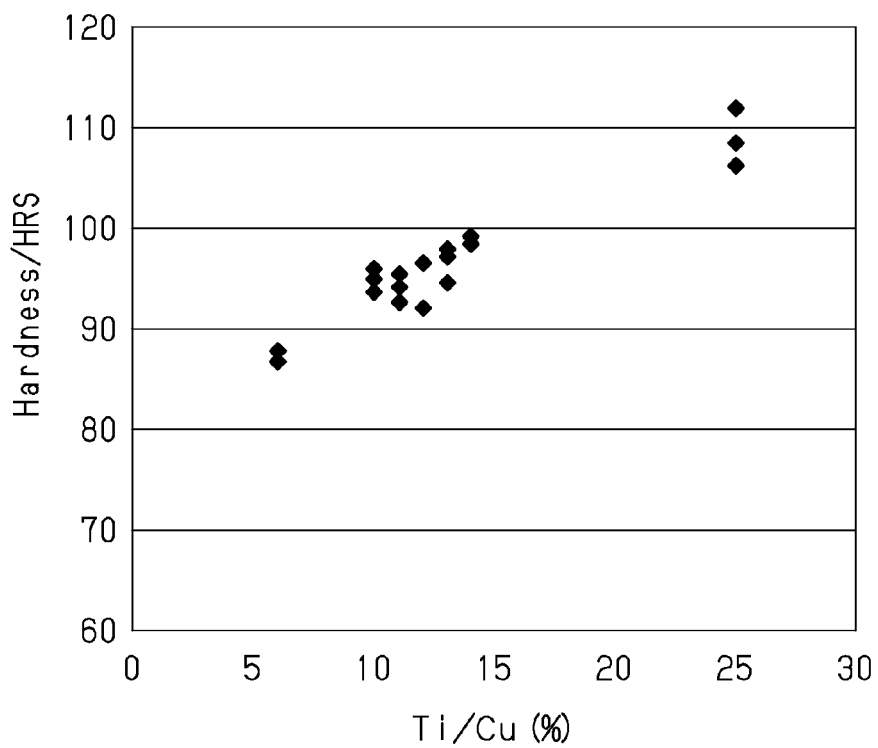
FIG. 4 is a graph showing the hardness of several examples of the friction member.

The hardness of several examples of friction members having a Ti/Cu ratio within 5% to 25% was obtained to study the relationship between the significantly improved wear resistance and the friction member hardness. The result is shown in FIG. 4. As the Ti/Cu ratio increases, the friction member hardness linearly increases. The results of FIGS. 3 and 4 show that the correlation coefficient between the wear resistance and the friction member hardness is lower than one.

Figure 5:
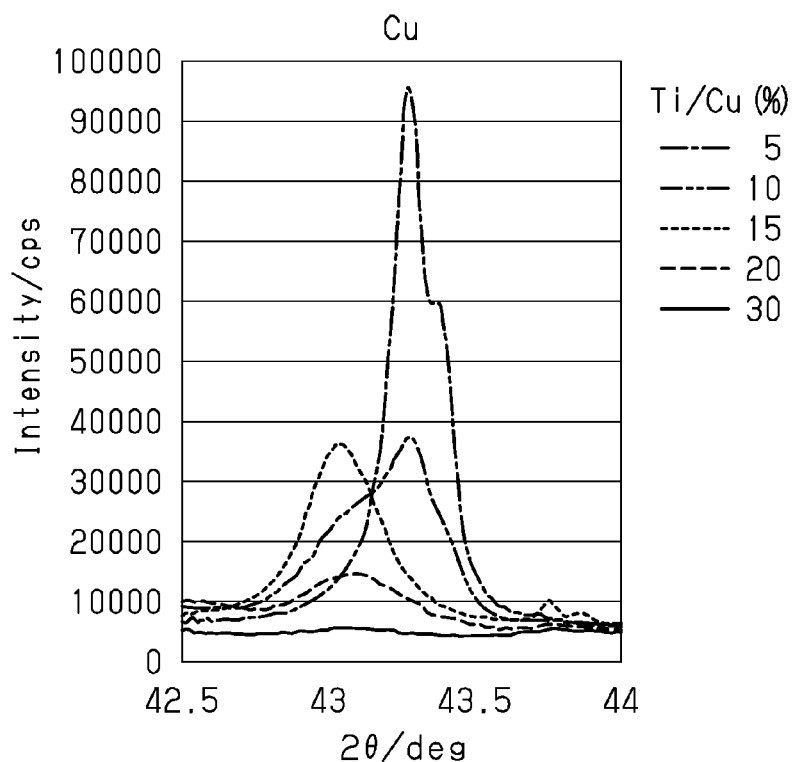
FIG. 5 is an X-ray analysis chart of examples of the friction member having various Ti/Cu ratios to illustrate a diffraction peak intensity of Cu.
Figure 6:
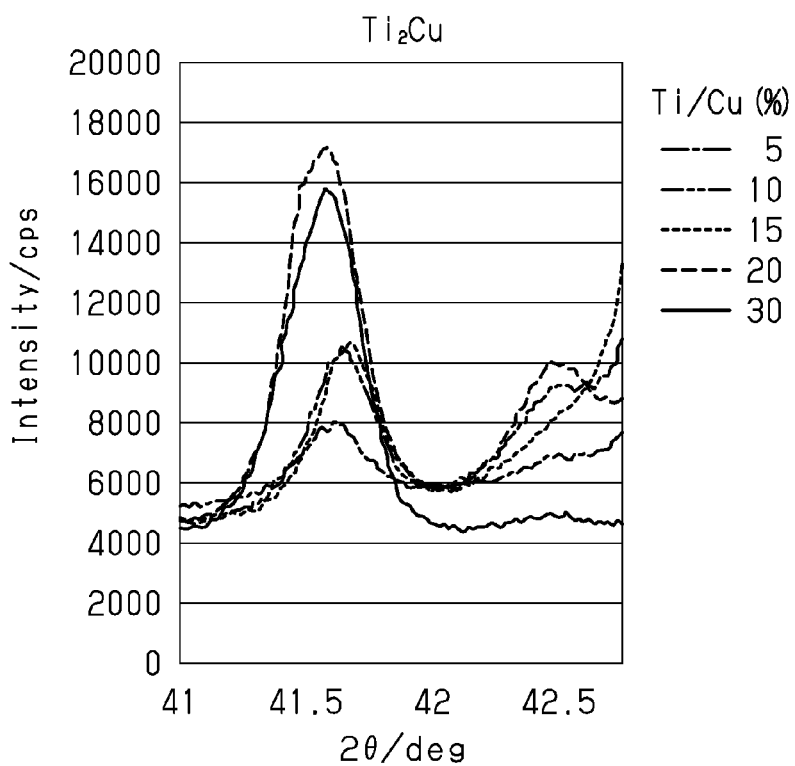
FIG. 6 is an X-ray analysis chart of examples of the friction member having various Ti/Cu ratios to illustrate a diffraction peak intensity of an intermetallic compound of $Ti_2Cu$.
Figure 7:
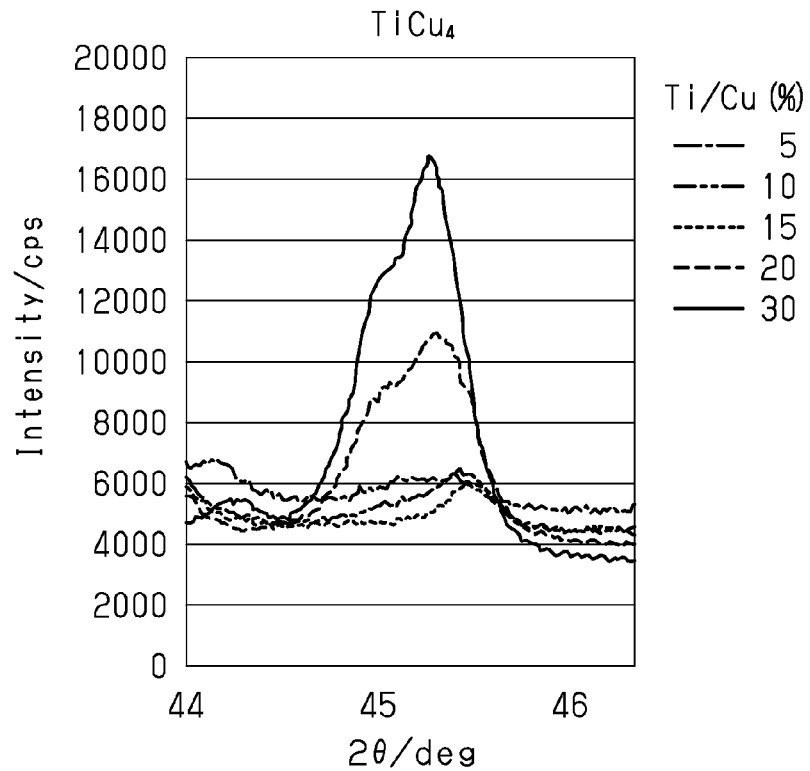
FIG. 7 is an X-ray analysis chart of examples of the friction member having various Ti/Cu ratios to illustrate a diffraction peak intensity of an intermetallic compound of $TiCu_4$.
Figure 8:
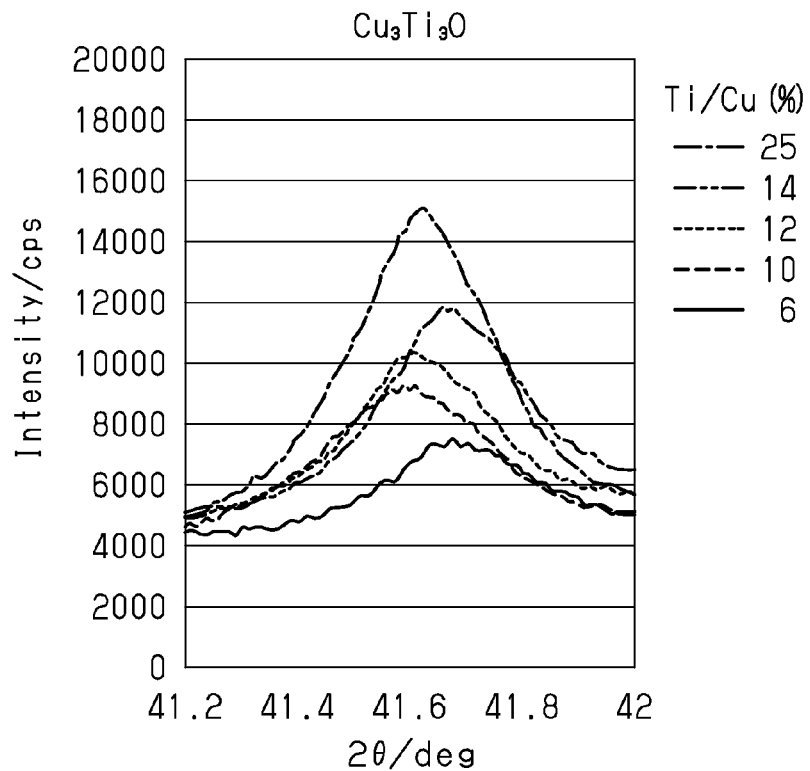
FIG. 8 is an X-ray analysis chart of examples of the friction member having various Ti/Cu ratios to illustrate a diffraction peak intensity of $Cu_3Ti_3O$.

The X-ray structure analysis was performed on several examples of friction members having the Ti/Cu ratio within 5% to 30% to find the component that improves the wear resistance. The results are shown in FIGS. 5 to 8. As shown in FIGS. 5 to 7, as the Ti/Cu ratio increases, Cu decreases and the intermetallic compound including $Ti_2Cu$ and $TiCu_4$ increases. As shown in FIGS. 6 and 7, when the Ti/Cu ratio exceeds 20%, $Ti_2Cu$ and $TiCu_4$ greatly increases. Further, as shown in FIG. 8, $Cu_3Ti_3O$ increases as the Ti/Cu ratio increases. The X-ray structure analyses of FIGS. 5 to 8 showed that the existence of $Cu_3Ti_3O$ and the intermetallic compound including at least one of $Ti_2Cu$ and $TiCu_4$ improved the friction member wear resistance.

The embodiment has the advantages described below.

(1) In the embodiment, the friction member 10 of a bicycle brake is obtained through combustion synthesis. This configuration allows for inexpensive manufacturing of the friction member 10 that has satisfactory braking performance.

(2) The friction member 10 includes an intermetallic compound obtained through combustion synthesis. This improves the braking performance, such as high temperature braking force (fade performance), the ratio of a wet condition braking force to a dry condition braking force (wet/dry ratio), wear resistance, braking noise, or the like. Preferably, the intermetallic compound is at least one of TiCu, $Ti_2Cu$, $Ti_3Cu_4$, $Ti_2Cu_3$, and $TiCu_4$.

(3) The friction member 10 further includes the metal phase 12. This improves the heat dissipation performance of the friction member 10 and the high temperature braking force (fade performance). Preferably, the metal phase 12 is at least one of Cu, Al, Zn, and Ni.

(4) Preferably, the friction member 10 includes TiC. This reduces cracks in the friction member 10 and increases the yield of the friction member 10.

(5) Preferably, the friction member 10 includes $Cu_3Ti_3O$. This improves the wear resistance of the friction member 10.

(6) The powder compacted body CB including at least three types of powder is subjected to combustion synthesis to obtain the friction member 10. This configuration allows for inexpensive manufacturing of the friction member 10 that has the desired shape.

(7) The at least three types of powder are copper powder, titanium powder, and carbon powder. This configuration obtains the inexpensive friction member 10 that is superior in high temperature braking force (fade performance), ratio of a wet condition braking force to a dry condition braking force (wet/dry ratio), wear resistance of a friction member, and braking noise.

(8) The powder compacted body CB contains 10 to 30 wt % of the carbon powder relative to the total weight of the copper powder. This configuration allows for reduction of cracks in the friction member 10, improvement in the yield of the friction member 10, and reduction of the manufacturing cost.

(9) The powder compacted body CB contains 0.1 to 50 wt % of the titanium powder relative to the total weight of the copper powder. This configuration allows for the friction member 10 to be obtained inexpensively and with satisfactory wear resistance.

(10) The powder compacted body CB contains 5 to 15 wt % of the titanium powder relative to the total weight of the copper powder. This configuration obtains the friction member 10 having significantly superior wear resistance.

(11) The method of manufacturing the friction member 10 includes molding the powder compacted body CB and subjecting the powder compacted body CB to the combustion synthesis. This configuration allows for inexpensive manufacturing of the friction member 10 that has the desired shape.

The embodiment may be modified as follows.

The friction member 10 of the embodiment is bonded to a support member, such as a back plate, a piston, or the like, to form a brake pad and may be applied to any bicycle brake, such as a disc brake, a rim brake, or the like.

The friction member 10 of the embodiment is formed from a composite material including a Cu—Ti based intermetallic compound, such as $Ti_2Cu$ or $TiCu_4$. The composite material has superior strength (particularly, tensile strength) and wear resistance. Thus, a bicycle component that is formed from the composite material is not limited to the friction member 10 and may be suitably used as a bicycle component, in which it is desired that the strength (particularly, tensile strength) and/or a wear resistance be improved. For example, the friction member may be formed from a composite material including an intermetallic compound of any combination of Al, Zn, Ni, and Ti.

Preferably, the maximum dimension (e.g., length) of the bicycle component including the Cu—Ti based intermetallic compound is 5 cm or less. When the maximum dimension is 5 cm or less, the bicycle component may be manufactured with a high yield. When the maximum dimension of the bicycle component exceeds 5 cm, cracks may form during combustion synthesis or during the annealing after combustion synthesis. This would lower the yield of the bicycle component.

Preferably, the bicycle component is a friction member for a bicycle brake. The maximum dimension of a friction member for a bicycle brake is approximately 5 cm, typically, approximately 2 cm, and thus may be manufactured with a high yield.

It should be apparent to those skilled in the art that the present invention may be embodied in many other specific forms without departing from the scope of the invention. For example, some of the components may be omitted from all components disclosed in the embodiments. Further, components in different embodiments may be appropriately combined. The present examples and embodiments are to be considered as illustrative and not restrictive, and the invention is not to be limited to the details given herein, but may be modified within the scope and equivalence of the appended claims.

The invention claimed is:

1. A friction member for a bicycle brake, wherein the friction member is obtained by subjecting a powder compacted body, which includes at least three types of powder, to combustion synthesis, wherein the at least three types of powder are copper powder, titanium powder, and carbon powder, and wherein the carbon powder is 10 to 30 wt % relative to the total weight of the copper powder.

2. The friction member according to claim 1, comprising an intermetallic compound obtained through combustion synthesis.

3. The friction member according to claim 2, further comprising a metal phase.

4. The friction member according to claim 3, wherein the metal phase includes at least one of Cu, Al, Zn, and Ni.

5. The friction member according to claim 4, wherein the metal phase includes Cu, and
the intermetallic compound includes at least one of TiCu, $Ti_2Cu$, $Ti_3Cu_4$, $Ti_2Cu_3$, and $TiCu_4$.

6. The friction member according to claim 5, further comprising at least one of TiC and $Cu_3Ti_3O$.

7. The friction member according to claim 1, wherein the powder compacted body contains 0.1 to 50 wt % of the titanium powder relative to the total weight of the copper powder.

8. The friction member according to claim 7, wherein the powder compacted body contains 5 to 15 wt % of the titanium powder relative to the total weight of the copper powder.

9. A friction member for a bicycle brake, the friction member comprising:
an intermetallic compound obtained from a first metal and a second metal; and
a metal phase formed from the first metal,
wherein the friction member is obtained by subjecting a powder compacted body, which includes at least three types of powder, to combustion synthesis,
the at least three types of powder are copper powder, titanium powder, and carbon powder, and
the powder compacted body contains 10 to 30 wt % of the carbon powder relative to the total weight of the copper powder.

10. The friction member according to claim 9, wherein the first metal is either one of Cu, Al, Zn, and Ni; and the second metal is Ti.

11. The friction member according to claim 10, wherein the first metal is Cu; and
the intermetallic compound is at least one of TiCu, $Ti_2Cu$, $Ti_3Cu_4$, $Ti_2Cu_3$, and $TiCu_4$.

12. The friction member according to claim 11, further comprising at least one of TiC and $Cu_3Ti_3O$.

13. The friction member according to claim 9, wherein the powder compacted body contains 0.1 to 50 wt % of the titanium powder relative to the total weight of the copper powder.

14. The friction member according to claim 13, wherein the powder compacted body contains 5 to 15 wt % of the titanium powder relative to the total weight of the copper powder.

15. A bicycle component comprising a Cu—Ti based intermetallic compound obtained by subjecting a powder compacted body, which includes at least copper powder, titanium powder, and carbon powder, to combustion synthesis, wherein the powder compacted body contains 10 to 30 wt % of the carbon powder relative to the total weight of the copper powder.

16. The bicycle component according to claim 15, further comprising a metal phase.

17. The bicycle component according to claim 16, wherein
the metal phase includes Cu; and
the Cu—Ti based intermetallic compound includes at least one of TiCu, $Ti_2Cu$, $Ti_3Cu_4$, $Ti_2Cu_3$, and $TiCu_4$.

18. The bicycle component according to claim 17, further comprising at least one of TiC and $Cu_3Ti_3O$.

19. The bicycle component according to claim 15, wherein the powder compacted body contains 0.1 to 50 wt % of the titanium powder relative to the total weight of the copper powder.

20. The bicycle component according to claim 19, wherein the powder compacted body contains 5 to 15 wt % of the titanium powder relative to the total weight of the copper powder.

21. The bicycle component according to claim 20, wherein the bicycle component is a friction member for a bicycle brake.

22. A method of manufacturing a friction member for a bicycle brake, the method comprising:

molding a powder compacted body which includes at least three types of powder, wherein the at least three types of powder are copper powder, titanium powder, and carbon powder, and wherein the carbon powder is 10 to 30 wt % relative to the total weight of the copper powder; and subjecting the powder compacted body to combustion synthesis.

23. The method of manufacturing a friction member according to claim 22, wherein the powder compacted body contains 0.1 to 50 wt % of the titanium powder relative to the total weight of the copper powder.

24. The method of manufacturing a friction member according to claim 23, wherein the powder compacted body contains 5 to 15 wt % of the titanium powder relative to the total weight of the copper powder.

* * * * *